(12) United States Patent
Galansky et al.

(10) Patent No.: US 11,780,298 B2
(45) Date of Patent: Oct. 10, 2023

(54) HEAT UTILISATION IN AN ENVIRONMENTAL CONTROL SYSTEM

(71) Applicant: THERMO KING LLC, Minneapolis, MN (US)

(72) Inventors: Martin Galansky, Rakovnik (CZ); Diego Cearra, Kraluv Dvur (CZ); Michal Kolda, Prague (CZ); Pavel Houdek, Kutna Hora (CZ)

(73) Assignee: THERMO KING LLC, Minneapolis, MN (US)

( * ) Notice: Subject to any disclaimer, the term of this patent is extended or adjusted under 35 U.S.C. 154(b) by 0 days.

(21) Appl. No.: 17/507,322

(22) Filed: Oct. 21, 2021

(65) Prior Publication Data
US 2022/0161633 A1 May 26, 2022

(30) Foreign Application Priority Data

Nov. 25, 2020 (EP) .................................... 20209909

(51) Int. Cl.
*B60H 1/32* (2006.01)
*B60H 1/00* (2006.01)

(52) U.S. Cl.
CPC ....... *B60H 1/3227* (2013.01); *B60H 1/00371* (2013.01); *B60H 1/32281* (2019.05)

(58) Field of Classification Search
CPC ........................... B60H 1/3227; B60H 1/3228; B60H 1/32281; B60H 1/00371; B60H 1/00921;

(Continued)

(56) References Cited

U.S. PATENT DOCUMENTS

| 6,935,421 B2 * | 8/2005 | Takeuchi | B60H 1/323 165/202 |
| 6,966,197 B2 * | 11/2005 | Itoh | F25B 13/00 62/93 |

(Continued)

FOREIGN PATENT DOCUMENTS

| EP | 3444542 | 2/2019 |
| WO | 2014/154326 | 10/2014 |

OTHER PUBLICATIONS

Extended European Search Report, issued in the corresponding EP patent application No. 20209909.9, dated May 3, 2021, 7 pages.

*Primary Examiner* — Marc E Norman
(74) *Attorney, Agent, or Firm* — Hamre, Schumann, Mueller & Larson, P.C.

(57) ABSTRACT

There is disclosed an environmental control system for heating at least one enclosed space. The system comprises a heat-pump circuit that includes a compressor, a heat-output stage, an expansion device and an evaporator arranged in series along a flow path for a refrigerant. The heat-output stage comprises a primary heat exchanger and a secondary heat exchanger that are both configured to transfer heat from the refrigerant to one or more external mediums in thermal communication with the at least one enclosed space. The primary heat exchanger and the secondary heat exchanger are connected in series along the flow path, such that the secondary heat exchanger will transfer excess heat energy remaining within the refrigerant after passing through the primary heat exchanger to the one or more external mediums.

18 Claims, 5 Drawing Sheets

(58) Field of Classification Search
CPC ............... F25B 39/04; F25B 2339/047; F25B 2313/02344; F25B 6/04; F25B 30/02; F24H 1/009; F24H 4/00; F24H 6/00
See application file for complete search history.

(56) References Cited

U.S. PATENT DOCUMENTS

| | | | |
|---|---|---|---|
| 2015/0183294 A1* | 7/2015 | Hamamoto | ............... F25B 5/04 62/208 |
| 2020/0164720 A1 | 5/2020 | Hotzel et al. | |
| 2021/0197646 A1* | 7/2021 | Argento | ............. B60H 1/00207 |

* cited by examiner

HEAT UTILISATION IN AN ENVIRONMENTAL CONTROL SYSTEM

FIELD

This disclosure is concerned generally with environmental control systems, such as heating, ventilation and air conditioning (HVAC) systems, with heat-pump capabilities. In particular, this disclosure is concerned with environmental control systems and methods having improved heating efficiency and coefficient of performance, i.e. the ratio of useful heating energy to work input to the system.

BACKGROUND

Environmental control systems, such as HVAC systems, have been developed to manage the environmental conditions, e.g. temperature, of an enclosed space. For example, HVAC systems are often used to heat the air within passenger compartments of mass-transit vehicles such as buses or trains.

Environmental control systems generally include a heat-pump circuit that includes a compressor, a heat-output stage (e.g. a condenser or a gas cooler, depending on the type of refrigerant used), an expansion device and an evaporator, which are connected in a loop. The heat-pump circuit generally defines a flow path for a refrigerant which is to be used to transfer heat energy absorbed by the refrigerant at the evaporator to the heat-output stage at which heat is then released from the refrigerant to heat the enclosed space.

The refrigerant flow path can be said to begin at the compressor, which is driven by a prime mover to compress the refrigerant to form a superheated refrigerant gas. The superheated refrigerant gas is then delivered to the heat-output stage, which is in the form of a heat exchanger that is in thermal communication with an enclosed space to be heated. The enclosed space will be relatively cooler than the superheated refrigerant gas, such that heat energy within the refrigerant will be transferred to and thus heat the enclosed space. The refrigerant, which at this point has either condensed to a liquid or is in the form of a cooled gas (which again depends on the type of refrigerant used), is delivered from the heat-output stage to the evaporator via the expansion device (or a series of devices serving to reduce the refrigerant pressure, including expansion valves and expansion vessels for local refrigerant accumulation etc.). The evaporator is in thermal communication with an ambient environment that is separate to the enclosed space (e.g. external to the vehicle). As ambient air circulates over the evaporator, the refrigerant (which at this point is in liquid phase) evaporates and absorbs heat energy from the ambient air. To complete a cycle about the heat-pump circuit, the refrigerant is delivered from the evaporator back to the compressor.

While such systems can satisfy the heating demands of most enclosed spaces, the heat exchange between the heat-exchanger and the enclosed space is an inefficient process such that not all of the heat generated by the system will be used to heat the enclosed space. This is unfavourable because it reduces the coefficient of performance (i.e. energy efficiency) of the system and can lead to higher running costs, amongst other things. For example, in order to satisfy the heating requirements of the enclosed space, the heat-pump circuit must work harder than what would otherwise be necessary if the system was more efficient, and does this by, e.g., driving the compressor at greater speeds etc.

Accordingly, the embodiments described herein seeks to improve the heating efficiency of environmental control systems.

SUMMARY

According to an aspect, there is provided an environmental control system for heating at least one enclosed space. The system comprises a heat-pump circuit that includes a compressor, a heat-output stage, an expansion device and an evaporator arranged in series along a flow path for a refrigerant. The heat-output stage comprises a primary heat exchanger and a secondary heat exchanger that are configured to transfer heat from the refrigerant to at least one external medium (e.g. respective external mediums) for heating the at least one enclosed space. The primary heat exchanger and the secondary heat exchanger are connected in series along the flow path, such that the secondary heat exchanger is configured to receive the refrigerant from the primary heat exchanger and to transfer heat remaining in the refrigerant after the primary heat exchanger to the at least one external medium. For example, the embodiments described herein provides two separate heat sources (in the form of the primary heat exchanger and the secondary heat exchanger) for heating the at least one enclosed space.

By providing a secondary heat exchanger in series connection with, and downstream of, a refrigerant outlet of the primary heat exchanger, heating capacity or heat energy remaining within the refrigerant after heat exchange at the primary heat exchanger can be utilised at the secondary heat exchanger to heat the at least one enclosed space. For example, the environmental control system can utilise heat energy (generated by the heat-pump circuit) that would otherwise be wasted or lost to the system. Accordingly, the heat-pump circuit e.g. the compressor, can be operated with a higher coefficient of performance, and it may be possible to meet a given heating demand in the enclosed space(s) with lower power consumption.

Further, by having two heat exchangers in the heat-output stage, the embodiments described herein provides a more versatile system that can be more readily adapted to maximize system efficiency. For example, the size (in terms of the area of heat-transfer surfaces) and/or location (relative to the enclosed space(s)) of the primary and secondary heat exchangers may be independently set and tailored at manufacture to the setting in which the system is to be implemented, to maximise system efficiency.

The at least one external medium may be any one or more heat-conducting mediums that are external to the heat-pump circuit itself. There may be more than one medium, e.g. one for each of the primary and secondary heat exchangers. Where there is more than one external medium, they may be in thermal communication with the same enclosed space or plural, different enclosed spaces, to heat the enclosed space(s).

Each one of the primary heat exchanger and the secondary heat exchanger may operate as a condenser and/or a gas cooler, depending on the type of refrigerant used in the heat-pump circuit. For example, in arrangements where a commonly used refrigerant such as the so-called "R407C" refrigerant is used, one or more of the primary and secondary heat exchangers may condense the refrigerant from the gas phase to a liquid as it releases energy to the external medium. Other refrigerants, however, may not undergo a phase-change from gas to liquid as it flows through the primary and/or secondary heat exchanger(s) and in such cases the primary heat exchanger and/or the secondary heat exchanger may be referred to as a gas cooler.

The primary heat exchanger and the secondary heat exchanger may be downstream of the compressor and upstream of the evaporator, in the refrigerant flow direction (about the heat-pump circuit during a heat-pump cycle).

The primary heat exchanger and the secondary heat exchanger may be the first two active components downstream of the compressor in the refrigerant flow direction.

The primary heat exchanger and the secondary heat exchanger may be upstream of the expansion device, e.g. a thermal expansion valve which is operable to control the amount of refrigerant released into the evaporator, which is itself upstream of the evaporator, in the refrigerant flow direction.

The primary heat exchanger and the secondary heat exchanger may be different types of heat exchangers.

The primary heat exchanger may be a refrigerant-to-liquid heat exchanger. That is, the heat exchanger may be configured to transfer heat from the refrigerant to a liquid medium external to the heat-pump circuit.

The secondary heat exchanger may be a refrigerant-to-gas heat exchanger. That is, the heat exchanger may be configured to transfer heat from the refrigerant to an external gaseous medium, such as the air within the at least one enclosed space.

The primary heat exchanger and the secondary heat exchanger may be configured to transfer heat from the refrigerant to respective external mediums, wherein both external mediums are for heating the at least one enclosed space.

As will become clearer in the detailed description below, arrangements in which the primary heat exchanger is a refrigerant-to-liquid heat exchanger and the secondary heat exchanger is a refrigerant-to-gas heat exchanger may be particularly advantageous to maximise the amount of refrigerant heating capacity that is utilised by the heat-output stage, and thus the coefficient of performance of the system.

The primary heat exchanger may be part of a first heat distribution loop which is in thermal communication with a first enclosed space to be heated. Where the primary heat exchanger is a refrigerant-to-liquid heat exchanger, the first heat distribution loop may comprise one or more distribution lines defining a flow path for the liquid medium to flow between the primary heat exchanger (at which the liquid medium will gain heat) and, e.g. one or more convector heaters located in, the enclosed space to be heated (at which the liquid medium will release heat).

The secondary heat exchanger may be part of a second heat distribution loop which is in thermal communication with the first enclosed space and/or a second enclosed space to be heated. Where the secondary heat exchanger is a refrigerant-to-gas heat exchanger, the second heat distribution loop may comprise one or more air ducts defining a flow path for the gaseous medium, e.g. the air within the first and/or second enclosed space, to flow between the secondary heat exchanger (at which the gaseous medium will gain heat) and the enclosed space to be heated (at which the gaseous medium will release heat).

The refrigerant may be carbon dioxide ($CO_2$) or a $CO_2$ based refrigerant. $CO_2$ or $CO_2$ based refrigerants may be advantageous over other known refrigerants such as R407C in that they operate at higher superheated gas temperatures, which increases the extent of heat transfer in the heat exchangers. Further, $CO_2$ is naturally occurring and has a global warming potential (GWP) value equal to 1.

The embodiments described herein are suitable for heating any type of enclosed space. The embodiments described herein may be particularly advantageous when used to heat an enclosed space within a vehicle. Thus, according to another aspect, there is provided a vehicle comprising an environmental control system as defined in any one of the preceding statements.

In such embodiments, the at least one enclosed space (e.g. the first and/or second enclosed space described above) may include a passenger compartment of the vehicle. The primary heat exchanger and the secondary heat exchanger may be configured to heat the same passenger compartment of the vehicle.

The vehicle may be any type of moveable body used for transporting people or goods. The vehicle may, for example, be a mass-transit vehicle such as a bus or a train carriage.

In implementations where a refrigerant-to-air heat exchanger is used in combination with a refrigerant-to-liquid heat exchanger on a mass transit vehicle, the applicant has gone against a long-held industry held practice not to use a refrigerant-to-air heat exchanger for heating such vehicles. Typically, in order to meet the heating demands of mass-transit vehicles, refrigerant-to-air heat exchangers need to be of a large size which is too impractical and heavy for use on such vehicles. For example, the additional size and weight associated with larger heat exchangers significantly increase the energy required to power the drivetrain of such vehicles. However, by providing a refrigerant-to-air heat exchanger in combination with a refrigerant-to-liquid heat exchanger, it is possible to meet the heating demand of the vehicle while reducing the overall size and weight of the heat-output stage, as compared to hypothetical arrangements in which only a refrigerant-to-air heat exchanger is used.

According to another aspect of the embodiments described herein, there is provided a method of heating at least one enclosed space using the environmental control system described above. The method comprises using the compressor to drive a flow of refrigerant along the flow path defined by the heat-pump circuit, wherein the refrigerant flows in a refrigerant flow direction from the compressor, through the primary heat exchanger of the heat-output stage and then through the secondary heat exchanger of the heat-output stage, such that the secondary heat exchanger transfers heat remaining in the refrigerant after the primary heat exchanger to the at least one external medium.

The at least one enclosed space may be within a vehicle as described above.

BRIEF DESCRIPTION OF THE DRAWINGS

The present disclosure will now be described by way of example with reference to the accompanying drawings, in which.

DETAILED DESCRIPTION

Figure 1:
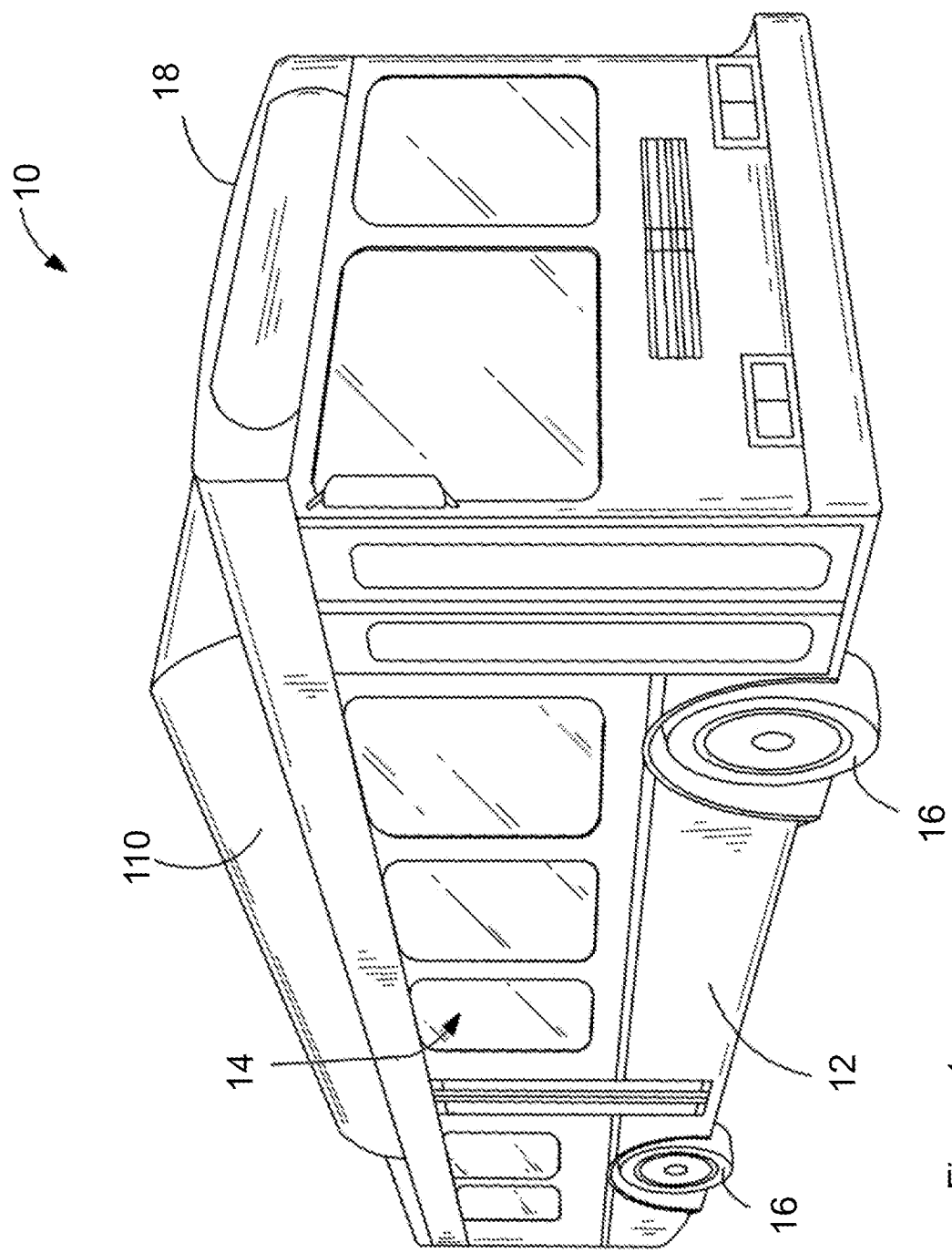
FIG. 1 is a schematic illustration of an exemplary vehicle with which an environmental control system may be used, according to one embodiment.

FIG. 1 shows an exemplary vehicle 10 with which the environmental control system of the embodiments described herein may be used. In the embodiment illustrated in FIG. 1, the vehicle 10 is a mass-transit bus that carries passengers (not shown) between destinations. However, the embodiments described herein is applicable more generally to any type of vehicle or indeed any type of transport unit (e.g., a container on a flat car, an intermodal container, a truck, a boxcar etc.) having an enclosed space that can be environmentally controlled. The system may be used, for example, with a train carriage.

As shown in FIG. 1, the vehicle 10 includes a frame 12, an enclosed space defining a passenger compartment 14 supported by the frame 12 and wheels 16. Although not shown, the vehicle 10 includes a propulsion system that is configured to drive the wheels 16 and drivetrain (not shown) of the vehicle 10. The propulsion system (e.g., prime mover, engine, etc.) can be an internal combustion engine or alternatively an electrical power source, e.g. a battery assembly, for powering a motor that is coupled to the drivetrain of the vehicle 10. The vehicle 10 may have a hybrid propulsion system comprising both an internal combustion engine and an electrical power source, which can be selectively used to power the drivetrain.

On a roof 18 of the vehicle 10, there is provided an environmental control system 110, in particular a HVAC system, configured to control one or more environmental conditions including, but not limited to, a temperature of the passenger compartment 14 (although the environmental control system may also or instead control conditions within an additional or alternative enclosed space within the vehicle 10).

Figure 2:
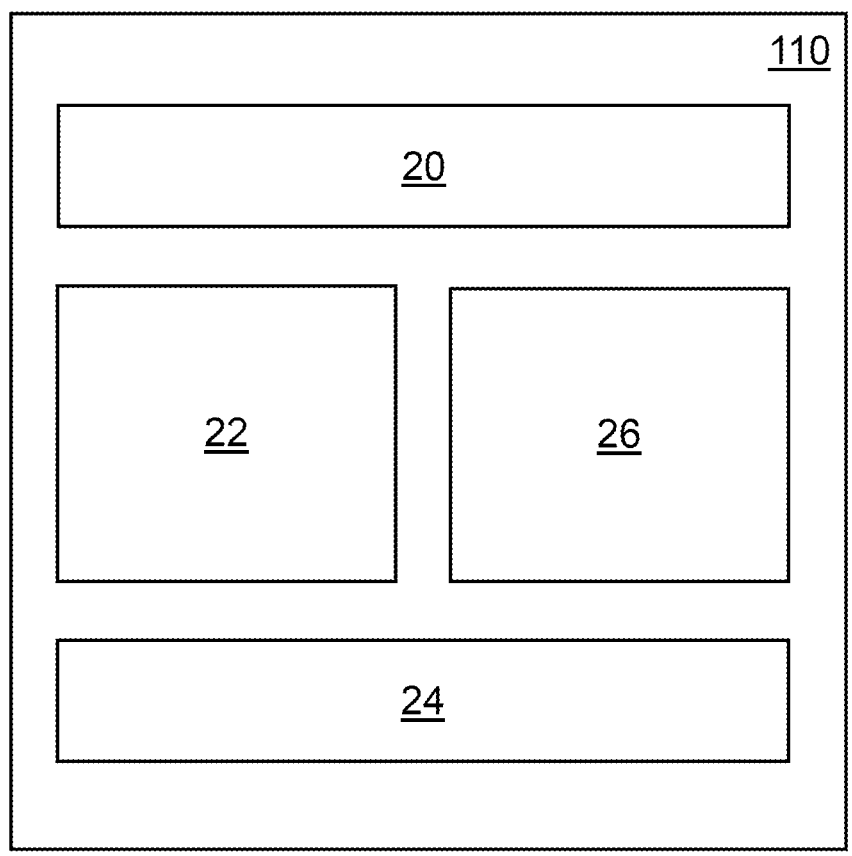
FIG. 2 is a block diagram schematically illustrating one embodiment of an environmental control system.

FIG. 2 is a schematic diagram representing the environmental control system 110 in greater detail.

The environmental control system 110 includes a programmable controller 20. The controller 20 may include a single integrated control unit (not shown) or a distributed network of control elements (not shown). The controller 20 can include a processor, a memory, a clock, and an input/output (I/O) interface (not shown).

The environmental control system 110 also includes a closed heat-pump circuit 22 and a heat distribution system 24 in thermal communication with the heat-pump circuit 22. The heat-pump circuit 22 includes a compressor, a heat-output stage, an expansion device (e.g. valve) and an evaporator which are operable, under the control of the controller 20, to transfer heat to the heat distribution system 24. The heat distribution system 24 is in thermal communication with the passenger compartment 14 and will therefore transfer heat received from the heat-pump circuit 22, specifically the heat-output stage thereof, to the passenger compartment 14. To facilitate this, the heat distribution system 24 includes at least one heat distribution loop (not shown) which defines a flowpath for a heat-conductive, fluid medium to pass between the heat-output stage, at which the fluid medium will take on heat from the refrigerant, and the relatively cooler passenger compartment 14, at which the fluid medium will release heat to the passenger compartment 14.

The controller 20 controls the heat-pump circuit 22 of the environmental control system 110 to obtain a desired state (i.e. temperature) of the passenger compartment 14. In particular, the controller 20 may be in wired or wireless communication with one or more sensing devices that are used to measure a number of operating conditions of the environmental control system 110, such as the internal temperature of the passenger compartment 14, ambient temperature, and operating parameters of the environmental control system 110, such as evaporator temperature, pressures, etc. in order to allow the controller 20 to draw a conclusion on what action has to be taken to achieve the desired state. For example, the controller 20 may compare the current state (e.g. passenger compartment temperature and ambient temperature) with a target state (e.g. a set point temperature for the passenger compartment 14) and regulate the current heating capacity delivered by the environmental control system 110 accordingly. This may be done by sending control signaling to various passive control devices of the environmental control system 110, such as refrigeration throttling valves, dampers etc., which control the movement of the refrigerant through the heat-pump circuit 20.

The environmental control system 110 further includes a power bay 26, which houses an internal combustion engine (e.g., diesel engine, etc.), that can provide power to drive the compressor and other components of the heat-pump circuit 22. The power bay 26 may also or instead house an on-board electric motor which can provide power to drive the compressor and other components instead of the combustion engine.

The controller 20 itself is powered by a power module (not shown), which can include one or more electrical power sources. The power sources receive electrical power from a generator machine (e.g., a belt-driven alternator, a direct drive generator, etc.) that is mechanically driven by the prime mover of the combustion engine or electric motor of the power bay 26. In other embodiments, however, components of the power bay 26 and/or power module may be integrated with one or more components of the propulsion system of the vehicle 10. For example, where the propulsion system of the vehicle 10 is a hybrid or fully-electric powered system, the on-board electric motor of the power bay 26 and/or the controller 20 of the environmental control system 110 may be powered by the electrical power source that is configured to power the drivetrain of the vehicle 10.

In conventional environmental control systems, the heat-output stage comprises a single heat exchanger, typically a refrigerant-to-liquid heat exchanger, to transfer heat from the refrigerant to an external liquid medium within the heat distribution system. However, the heat exchange process in such arrangements is not perfectly efficient such that not all of the heat energy available within the refrigerant will be transferred to the liquid medium and thus the passenger compartment via the heat distribution system. Furthermore, in refrigerant-to-liquid heat exchangers, the temperature of the refrigerant will always be much higher than that of the liquid medium and the air temperature in the passenger compartment.

It may be possible to use a refrigerant-to-gas heat exchanger instead of the refrigerant-to-liquid heat exchanger. In such arrangements, it is possible in theory to remove any temperature differential between the refrigerant and the gaseous medium at their respective outlets, such that most of the available heating capacity in the refrigerant will be transferred to the heat distribution system. However, in reality such conditions can only be achieved using very large heat exchangers that are often too bulky and heavy for practical and economic use, e.g., on vehicles etc. Therefore, at the scale appropriate for being fitted to a vehicle, a refrigerant-to-gas heat exchanger will output refrigerant at a temperature that is higher than the temperature of the gaseous medium and thus the passenger compartment.

The Applicant has recognised that, in both of the above arrangements in which the temperature of the refrigerant at the outlet of the heat exchanger is above that of the fluid medium in the heat distribution system and thus the temperature of the passenger compartment, there is idle heat energy and heating capacity within the refrigerant. The embodiments described herein, therefore, seeks to utilise at least some of that available heating capacity to transfer additional heat energy to the heat distribution system. This is achieved by providing a heat-output stage having two separate heat exchangers, specifically a primary heat exchanger and a secondary heat exchanger, arranged in series within the heat-pump circuit. The heat exchangers are arranged in series such that the secondary heat exchanger will receive the refrigerant from the primary heat exchanger, which is itself downstream of the compressor. In this way, the secondary heat exchanger may be configured to utilise excess heat remaining within the refrigerant after passing through the primary heat exchanger.

Figure 3:
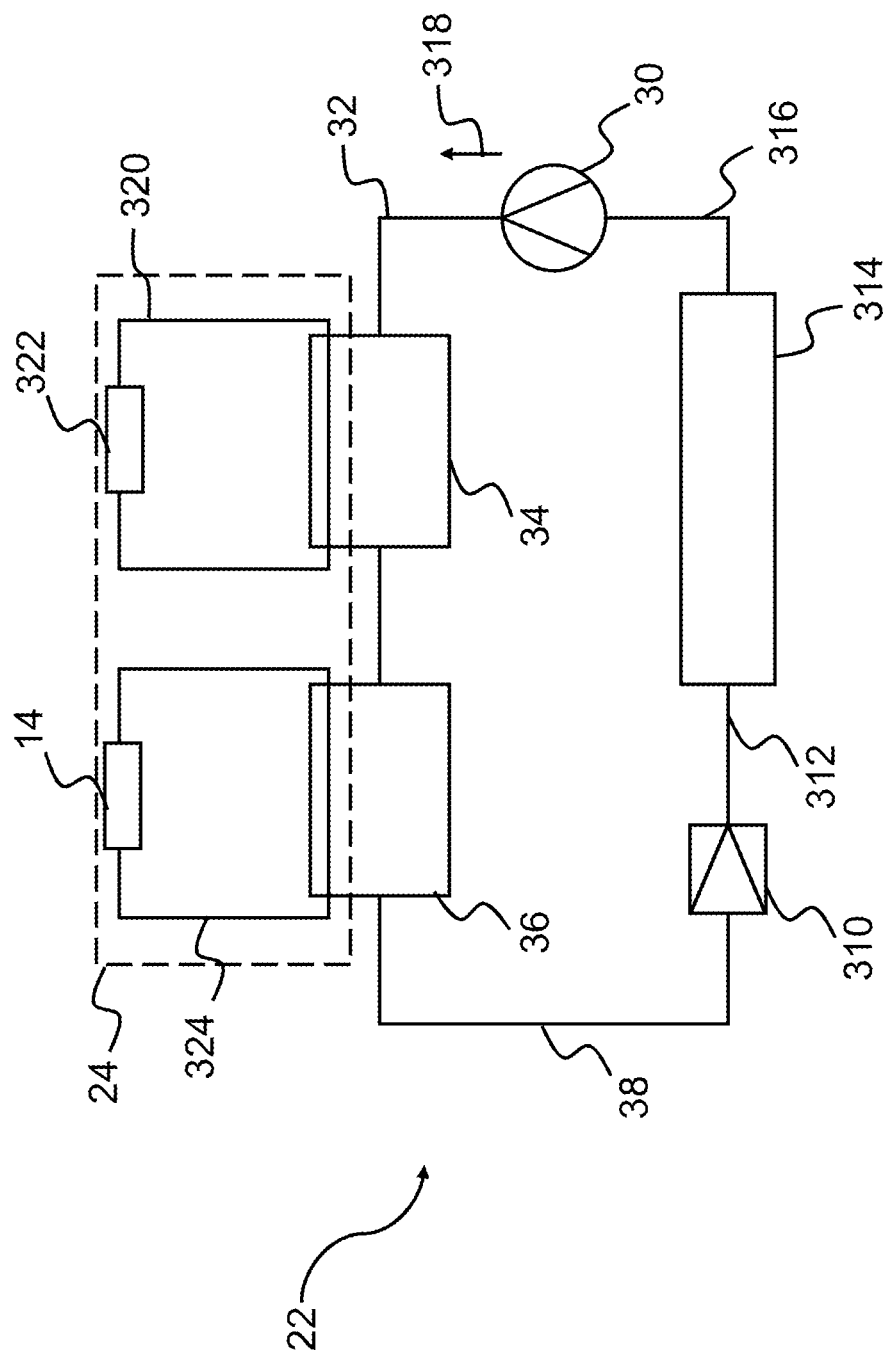
FIG. 3 is a circuit diagram schematically illustrating a heat-pump circuit and a heat distribution system of an environmental control system, in accordance with one embodiment.

FIG. 3 schematically illustrates the heat-pump circuit 22 and heat distribution system 24 of FIG. 2 in accordance with an example embodiment of the embodiments described herein.

The heat-pump circuit 22 includes a compressor 30, a compressor discharge line 32, a primary heat exchanger 34, a secondary heat exchanger 36, an output line 38, an expansion device (e.g. expansion valve) 310, an evaporator input line 312, an evaporator 314, and a suction line 316 connected in series. The heat-pump circuit 22 generally defines a flowpath for a refrigerant, which in this embodiment may be $CO_2$ or a $CO_2$ based refrigerant, such as so-called "R-744" or "R-455A" refrigerants, or similar.

The primary heat exchanger 34 and the secondary heat exchanger 36 are the first two active components located downstream of the compressor 30 in a refrigerant flow direction 318. The heat exchangers 34, 36 are said to be "active" in that they are configured to transfer heat between two heat-conductive mediums, i.e. the refrigerant and an external fluid medium. This is in contrast to passive components of the circuit 22, such as valves or vessels etc., which are not configured to exchange heat energy between different mediums.

In that regard, it will be appreciated that the heat-pump circuit 22, e.g. the output line 38 and/or the suction line 316, may contain any number of passive components, such as shut-off, check or expansion devices (valves), and/or vessels for local refrigerant accumulation or other purposes. Additionally or alternatively, the heat-pump circuit 22 may include one or more internal heat-exchangers providing internal refrigerant-to-refrigerant heat exchange within the heat pump 22 circuit itself. It will be appreciated that an internal heat exchanger differs from the primary heat exchanger 34 and the secondary heat exchanger 36 in that it is configured to exchange heat between refrigerant located at different points along the flowpath of the heat-pump circuit 22 itself, whereas the primary heat exchanger 34 and the secondary heat exchanger 36 are external heat exchangers configured to transfer heat from the refrigerant to a separate heat-conductive medium that is external to the refrigerant flowpath.

In the present embodiment, the primary heat exchanger 34 is in the form of a refrigerant-to-liquid heat exchanger, which operates to transfer heat present within the refrigerant after the compressor to an external liquid medium, such as a glycol or a water-based liquid. The primary heat exchanger 34 may be any type of known heat exchanger which is suitable for transferring heat from the refrigerant to a liquid medium, including a Brazed-Plate heat exchanger, a Tube in Tube heat exchanger, a Shell and Tube heat exchanger, or similar heat exchangers known in the art.

The primary heat exchanger 34 and liquid medium forms part of the heat distribution system 24 of the vehicle 10, in particular a first heat distribution loop 320 of the system 24. The first heat distribution loop 320 comprises one or more distribution lines (e.g. tubes) that are configured to receive a flow of heated liquid from a liquid outlet of the primary heat exchanger 34 and deliver it to locations within the vehicle 10 that require heating, before returning the liquid back to a liquid inlet of the primary heat exchanger 34. In the illustrated example, the first heat distribution loop 320 includes at least one convector heater 322 which is located within the passenger compartment 14 of the vehicle 10 to heat the air within that compartment 14. The first heat distribution loop 320 may also be in thermal communication with one or more other compartments within the vehicle 10, such as compartments that house electronic components such as batteries that require heating.

The secondary heat exchanger 36 is in the form of a refrigerant-to-gas heat exchanger, which operates to transfer excess heat remaining within the refrigerant after the primary heat exchanger 34 to an external gaseous medium, in this case the air within the passenger compartment of the vehicle. The secondary heat exchanger 36 may be any known heat exchanger which is suitable for transferring heat from the refrigerant to an external gaseous medium, such as a Fin and Tube heat exchanger or a micro-channel heat exchanger.

The secondary heat exchanger 36 and gaseous medium (air) forms part of a second heat distribution loop 324 of the heat distribution system 24. The second heat distribution loop 324 comprises one or more ducts for channeling air between the passenger compartment 14 and the secondary heat exchanger 36. In particular, an air inlet of the secondary heat exchanger 36 is in fluid communication with the passenger compartment 14 via the one or more ducts, so as to receive air from the passenger compartment 14 to be heated. The air inlet to the secondary heat exchanger 36 may also be in fluid communication with fresh air from outside of the vehicle 10. Correspondingly, the duct(s) may be configured to channel the heated air exiting an air outlet of the secondary heat exchanger 36 to the passenger compartment 14. Similarly to the first heat distribution loop 320, the second heat distribution loop 324 may also or instead be in thermal communication with one or more other compartments within the vehicle 10, such as compartments that house electronic components such as batteries that require heating.

By providing the secondary heat exchanger 36 downstream of the primary heat exchanger 34, the heat-pump circuit 22 is able to utilise available heating capacity within the refrigerant exiting the primary heat exchanger 34 to heat the passenger compartment 14.

In that regard, the heating capacity of a heat exchanger can be readily determined using conventional techniques known in the art. Further, it is possible to tailor the size of each of the heat exchangers, e.g. in terms of the area of their heat transfer surfaces, to ensure that they are able to achieve a desired heating capacity for a given application, i.e. to meet a heating demand of the passenger compartment 14.

The system controller 20 can also manage refrigerant flow through the heat exchangers, e.g. using one or more passive components such as valves, to control and optimize heating performance between the primary and secondary heat exchangers. In other words, it is possible to control the amount of heating capacity that is utilized at the primary heat exchanger to ensure that the best split of total available capacity (i.e. in the refrigerant exiting the compressor) is achieved between the primary and secondary heat exchangers based on actual system requirements. In this way, it is possible to design an environmental control system to maximize the coefficient of performance of the system.

Figure 4:
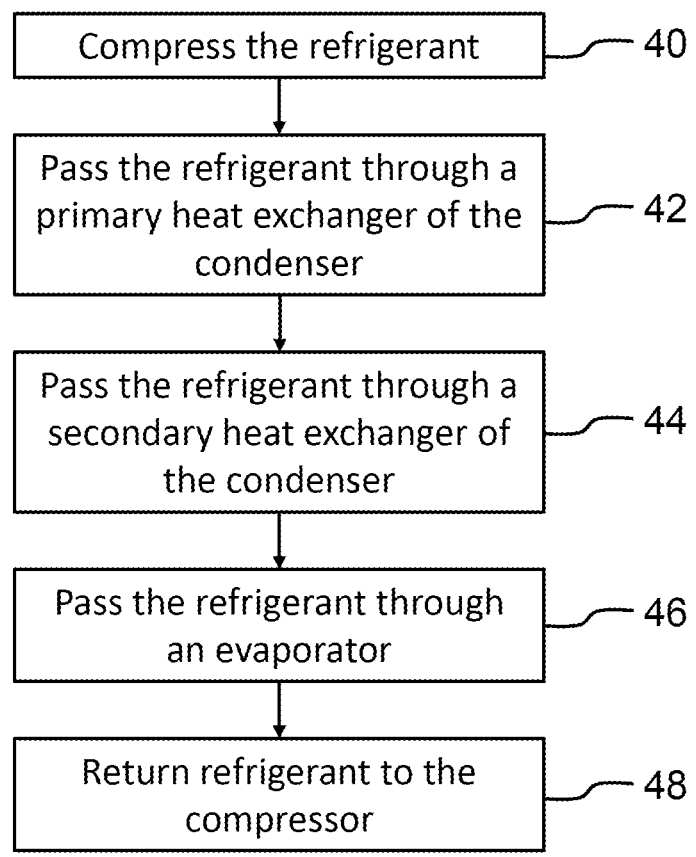
FIG. 4 is a flow diagram schematically illustrating a method of using the environmental control system of FIGS. 1 to 3 to heat an enclosed space of a vehicle, according to one embodiment.

FIG. 4 is a flow diagram schematically illustrating a method of operating the environmental control system of FIGS. 1 to 3 during a heat-pump cycle to heat an enclosed space of a vehicle.

The method begins at block 40, at which the refrigerant within the flow path is compressed by the compressor 30 to form a superheated refrigerant gas, which is then delivered along the compressor discharge line 32 in the flow direction 318 to a downstream refrigerant inlet of the primary heat exchanger 34.

Figure 5:
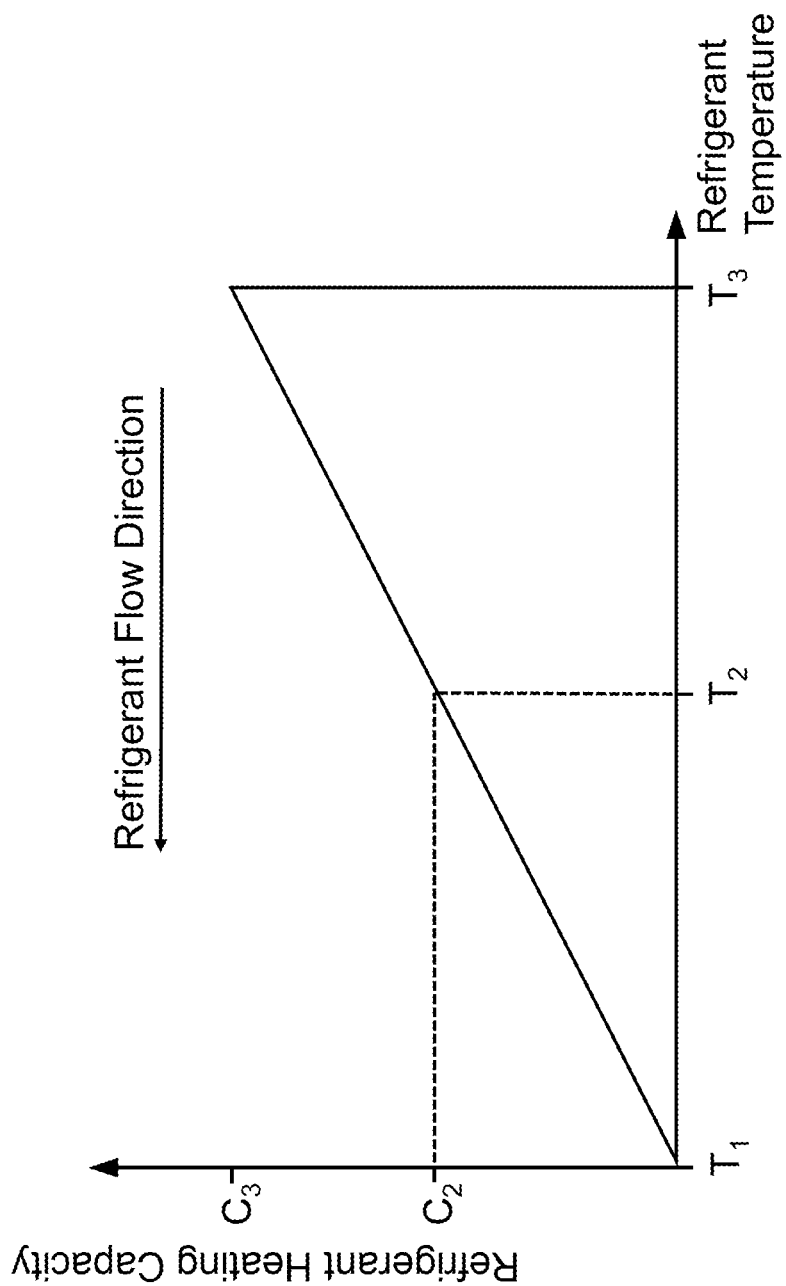
FIG. 5 is a graph schematically illustrating available heating capacity versus temperature of the refrigerant during operation of the environmental control system of FIGS. 1 to 3.

As best shown in FIG. 5, the refrigerant within the heat-pump circuit 22 will be at its maximum temperature, $T_3$, substantially immediately after discharge from the compressor 30. Furthermore, the temperature of the refrigerant will be significantly above the air temperature, $T_1$, within the passenger compartment 14, and correspondingly the liquid medium within the first heat distribution loop 320. Therefore, the available heating capacity within the refrigerant will be at its maximum value, $C_3$, at that point.

At block 42, the superheated refrigerant gas passes through the primary heat exchanger 34 and transfers some of its thermal energy to the liquid medium within the first heat distribution loop 320. During this process, and as shown in FIG. 4, the temperature of the refrigerant decreases to an intermediate temperature level, $T_2$, at the refrigerant outlet of the primary heat exchanger 34. The temperature, $T_2$, of the refrigerant at the outlet of the primary heat exchanger 34 will be higher than the temperature, $T_1$, of the air within the passenger compartment 14 (and indeed the primary heat exchanger 34 may be designed to ensure that is the case). As such, the refrigerant exiting the primary heat exchanger 34 will have excess heating capacity, $C_2$, available to use at that point.

At block 44, the refrigerant flows downstream to and through the secondary heat exchanger 36, which is the second active component downstream of the compressor 30. By passing the refrigerant through the secondary heat exchanger 36 downstream of the primary heat exchanger 34, the available heating capacity, $C_2$, present within the refrigerant exiting the primary heat exchanger 34 will be utilised to heat the passenger compartment 14. Indeed, as shown in FIG. 5, it is possible to design the refrigerant-to-air secondary heat exchanger 36 to utilise most if not all of the remaining heating capacity, $C_2$, within the refrigerant until it is depleted and the temperature of the refrigerant reduces close to the same temperature, $T_1$, as that of the passenger compartment 14.

It will be appreciated here that by providing a combination of different heat exchangers, in particular a refrigerant-to-gas heat exchanger downstream of a refrigerant-to-liquid heat exchanger, it is possible to maximise the utilisation of available heating capacity within the refrigerant. Further, by providing a refrigerant-to-gas heat exchanger downstream of a refrigerant-to-liquid heat exchanger, which will serve at least some of the heating demands of the passenger compartment 14, it is possible to deplete the remaining heating capacity within the refrigerant using a refrigerant-to-air secondary heat exchanger 36 that is smaller and lighter than what would otherwise be required if the heat-output stage comprises a single refrigerant-to-gas heat exchanger. This avoids size and weight issues associated with refrigerant-to-gas heat exchangers.

At block 46, after exiting the secondary heat exchanger 36, the refrigerant, which at this point has cooled down and condensed to a liquid or is in the form of a cooled gas (depending on the refrigerant used), is delivered along the evaporator input line 312 to the downstream evaporator 314, but via the expansion device (valve) 310 which is located upstream of the evaporator 314 on the output line 38. The evaporator 314 is in thermal communication with an ambient environment that is external to the passenger compartment 14 (and, e.g. the vehicle). As ambient air circulates over the evaporator, liquid phase refrigerant evaporates and absorbs heat energy from the ambient air as it passes through the evaporator.

At block 48 the vapour refrigerant is delivered from the evaporator 314 back to the compressor 30 along suction line 316 to restart the heat-pump cycle.

Although the embodiments herein has been described above as being used to heat the same enclosed space, i.e. the passenger compartment 14 of the vehicle 10, the different heat distribution loops may be used to heat two separate enclosed spaces (compartments). Indeed, a further possible advantage of the embodiments described herein is that the secondary heat exchanger can use excess heating capacity remaining from the primary heat exchanger for an entirely separate heating application to the primary heat exchanger.

It will also be appreciated that although the embodiments herein has been described above as having a refrigerant-to-liquid heat exchanger as the primary heat exchanger and a refrigerant-to-air heat exchanger as the secondary heat exchanger, this is not required. Instead, the specific sequence of heat exchangers may be selected as appropriate for a given application. As mentioned above, it is possible to control the amount of heating capacity that is utilized at the primary heat exchanger to ensure that the best split of total available capacity is achieved between the primary and secondary heat exchangers based on actual system requirements.

In view of the above, it can be seen that the present disclosure provides an environmental control system that can be used advantageously to maximise the heat transfer from the refrigerant within the heat-pump circuit to an enclosed space to be heated, and thus the system efficiency.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. That is, the present disclosure is not limited to the embodiments above-described and except where mutually exclusive, any of the features may be employed separately or in combination with any other features and the disclosure extends to and includes all combinations and sub-combinations of one or more features described herein.

The word "embodiment" as used within this specification may, but does not necessarily, refer to the same embodiment. This specification and the embodiments described are examples only. Other and further embodiments may be devised without departing from the basic scope thereof, with the true scope of the disclosure being indicated by the claims that follow.

The invention claimed is:

1. An environmental control system for heating at least one enclosed space, comprising:
   a heat-pump circuit that includes a compressor, a heat-output stage, an expansion device and an evaporator arranged in series along a flow path for a refrigerant;
   wherein the heat-output stage comprises a primary heat exchanger and a secondary heat exchanger that are configured to transfer heat from the refrigerant to at least one external medium for heating the at least one enclosed space;
   wherein the primary heat exchanger and the secondary heat exchanger are connected in series along the flow path, such that the secondary heat exchanger is configured to receive the refrigerant from the primary heat exchanger and to transfer heat remaining in the refrigerant after the primary heat exchanger to the at least one external medium;
   wherein the primary heat exchanger is part of a first heat distribution loop which is in thermal communication with a first enclosed space to be heated; and
   the secondary heat exchanger is part of a second heat distribution loop which is in thermal communication with a second enclosed space to be heated.

2. An environmental control system as claimed in claim 1, wherein the primary heat exchanger and the secondary heat exchanger are downstream of the compressor and upstream of the evaporator, in the refrigerant flow direction.

3. An environmental control system as claimed in claim 1, wherein the primary heat exchanger and the secondary heat exchanger are active components configured to transfer heat between heat-conductive mediums; and
   wherein the primary heat exchanger and the secondary heat exchanger form a first two active components downstream of the compressor in the refrigerant flow direction.

4. An environmental control system as claimed in claim 1, wherein the primary heat exchanger and the secondary heat exchanger are upstream of the expansion device, which is itself upstream of the evaporator, in the refrigerant flow direction.

5. An environmental control system as claimed in claim 1, wherein the primary heat exchanger is a refrigerant-to-liquid heat exchanger.

6. An environmental control system as claimed in claim 1, wherein the secondary heat exchanger is a refrigerant-to-gas heat exchanger.

7. An environmental control system as claimed in claim 1, wherein the primary heat exchanger is a refrigerant-to-liquid heat exchanger and the secondary heat exchanger is a refrigerant-to-gas heat exchanger.

8. An environmental control system as claimed in claim 7, wherein the primary heat exchanger and the secondary heat exchanger are configured to transfer heat from the refrigerant to respective external mediums, wherein both external mediums are for heating the at least one enclosed space.

9. An environmental control system as claimed in claim 1, wherein the refrigerant is $CO_2$ or a $CO_2$ based refrigerant.

10. A vehicle comprising an environmental control system as claimed in claim 1.

11. A vehicle as claimed in claim 10, wherein the at least one enclosed space is a passenger compartment of the vehicle.

12. A vehicle as claimed in claim 10, wherein the vehicle is a mass-transit vehicle.

13. A method of heating at least one enclosed space using an environmental control system as claimed in claim 1, the method comprising:
    using the compressor to drive a flow of refrigerant along the flow path defined by the heat-pump circuit, wherein the refrigerant flows in a refrigerant flow direction from the compressor, through the primary heat exchanger of the heat-output stage and then through the secondary heat exchanger of the heat-output stage, such that the secondary heat exchanger transfers heat remaining in the refrigerant after the primary heat exchanger to the at least one external medium;
    wherein:
      the primary heat exchanger is part of a first heat distribution loop which is in thermal communication with a first enclosed space to be heated; and
      the secondary heat exchanger is part of a second heat distribution loop which is in thermal communication with a second enclosed space to be heated.

14. A method as claimed in claim 13, wherein the at least one enclosed space is within a vehicle.

15. A method as claimed in claim 13, wherein the primary heat exchanger is a refrigerant-to-liquid heat exchanger.

16. A method as claimed in claim 13, wherein the secondary heat exchanger is a refrigerant-to-gas heat exchanger.

17. A method as claimed in claim 13, wherein the primary heat exchanger is a refrigerant-to-liquid heat exchanger and the secondary heat exchanger is a refrigerant-to-gas heat exchanger.

18. A method as claimed in claim 17, wherein the primary heat exchanger and the secondary heat exchanger are configured to transfer heat from the refrigerant to respective external mediums, wherein both external mediums are for heating the at least one enclosed space.

* * * * *